United States Patent [19]
Ono et al.

[11] Patent Number: 5,948,151
[45] Date of Patent: Sep. 7, 1999

[54] EMULSION INK FOR STENCIL PRINTING

[75] Inventors: Ryuta Ono; Sadanao Okuda, both of Inashiki-gun, Japan

[73] Assignee: Riso Kagaku Corporation, Tokyo, Japan

[21] Appl. No.: 08/986,874

[22] Filed: Dec. 8, 1997

[30] Foreign Application Priority Data

Dec. 6, 1996 [JP] Japan .................................. 8-342809

[51] Int. Cl.$^6$ .................................................. C09D 11/02
[52] U.S. Cl. ........................................ 106/31.26; 106/31.6
[58] Field of Search ................................ 106/31.26, 31.6

[56] References Cited

U.S. PATENT DOCUMENTS

| | | | |
|---|---|---|---|
| 5,395,435 | 3/1995 | Mizobuchi | 106/31.26 |
| 5,609,670 | 3/1997 | Okuda et al. | 106/31.26 |
| 5,718,747 | 2/1998 | Okusawa et al. | 106/31.26 |
| 5,718,748 | 2/1998 | Suzuki et al. | 106/31.26 |
| 5,738,715 | 4/1998 | Okuda et al. | 106/31.26 |
| 5,800,599 | 9/1998 | Asada | 106/31.26 |

*Primary Examiner*—Helene Klemanski
*Attorney, Agent, or Firm*—Pillsbury Madison & Sutro LLP

[57] ABSTRACT

A W/O emulsion ink, which is superior in emulsion stability, causes no softening or separation even after stored for a long time, and can always provide prints of uniform quality, is provided. The emulsion ink has an oil phase and a water phase, in which said water phase has a pH of 6.0 to 12.0, preferably 7.0 to 9.0 at 23° C. The emulsion ink may contain a water-insoluble colorant in the water phase and/or the oil phase. Preferably, the water phase has a pH buffer action.

4 Claims, No Drawings

EMULSION INK FOR STENCIL PRINTING

The present invention relates to an emulsion ink for stencil printing, and more specifically relates to an emulsion ink which is low in viscosity change and can always provide prints of uniform quality.

Stencil printing is achieved by perforating a stencil sheet to make a master, and passing inks through the perforated portions of the master to an article to be printed such as printing paper. Since the master is easy to make, stencil printing is utilized in a wide range of fields.

Water-in-oil (W/O) emulsion inks are commonly used for stencil printing. When a proportion of the water phase in the emulsion ink is increased, the ink becomes excellent in dryability and low in temperature dependency, but becomes inferior in emulsion stability, often causing the ink to be softened or separated in the course of time. If a softened or separated ink is used for printing, an amount of ink transferred onto prints is increased, causing blurring of printing, seep through, set off, unevenness of printing density, or the like.

In order to improve the above defects, have been suggested a method in which the water phase is thickened by addition of water-soluble polymers to minimize a difference in viscosity between the water phase and the oil phase (Japanese Patent Publication (Kokoku) No. 2165/69), a method in which the ink is provided with a water-soluble solvent phase, an activator phase and a resinous phase (Japanese Patent Publication (Kokoku) No. 7370/77), and a method in which hydroxy fatty acid esters of polyglycerin or polyhydric sugar alcohol are added to strengthen an interface of the emulsion (Japanese Patent Publication(Kokoku) No.78433/91). However,these methods are still not satisfactory.

As prior art, electrolytes such as metallic salts of boric acid have been added to the water phase of the emulsion in expectation of improvement in stability that may be caused by their action on the emulsion interface as counter ions. Also, inorganic salts such as sodium hydroxide and potassium hydroxide have been added to the water phase as agents for thickening viscosity of a water-soluble polymer contained in the water phase in expectation of improvement in stability that may be caused by reduction of a difference in viscosity between the water phase and the oil phase. However, addition of these inorganic salts to the water phase is not intended for adjustment of pH, but rather the pH readily varies depending upon the addition amount thereof.

It is an object of the present invention to provide a stencil printing emulsion ink which is kept low in viscosity change in the course of time and thus can always provide prints of uniform quality.

According to the present invention, the above object is attained by a water-in-oil (W/O) emulsion ink for stencil printing, having an oil phase and a water phase, in which said water phase has a pH of 6.0 to 12.0, preferably 7.0 to 9.0 at 23° C.

According to the present invention, no pH adjusting agent has to be contained in the water phase of the emulsion if the water phase is stably kept within the above range of pH. However, it is usually desirable that a pH adjusting agent is added to the water phase because pH of the water phase is readily varied when various additives are added to the water phase. Further, since emulsifiers used for stencil printing emulsion inks are, in many cases, nonionic surfactants, the addition of the pH adjusting agent is considered to contribute stabilization of emulsion thanks to an interaction between the pH adjusting agent and polar groups of the surfactants as well as an increase in adsorption of counter ions.

As pH adjusting agents, may be used disodium hydrogenphosphate, potassium dihydrogenphosphate, sodium tertiary phosphate, sodium hydrogencarbonate, sodium carbonate, sodium hydroxide, potassium hydroxide, potassium chloride, ammonium chloride, boric acid, sodium tetraborate, ammonia, triethylamine, diethanolamine, triethanolamine, 2-amino-2-methylpropanol, 2-amino-2-methyl-1,3-propanediol, tris(hydroxymethyl) aminomethane, N,N-diethylglycine sodium salt, and hydrochloric acid. These compounds can be used alone or in combination of two or more. The water phase can be adjusted to a desired pH by selecting an addition amount or a combination of the above compounds. Preferably, the pH adjusting agent should have pH buffer action in order to avoid variation of pH that may be caused by action of other additives.

As colorants used in the present emulsion ink, mention may be made of water-insoluble colorants selected from known pigments, dispersed dyes and the like of various colors. The water-insoluble colorant may be present in the water phase and/or the oil phase. Examples of water-insoluble colorants are carbon blacks such as furnace carbon black, lampblack, acetylene black and channel black; metals, metal oxides and metal sulfides such as of cobalt, iron, chromium, copper, zinc, lead, titanium, vanadium, manganese and nickel; inorganic pigments such as red iron oxide, loess, ultramarine and Prussian blue; organic pigments such as azo-based, phthalocyanine-based, dye-based, condensed ring-based, nitro-based, nitroso-based, alkali blue-based and aniline black-based pigments including Hansa Yellow, Carmine 6B, disazo yellow, cyanine blue, Phthalocyanine Blue and Chrome Fast Red; and dispersed dyes such as azo-based, anthraquinone-based, azomethine-based and nitro-based ones.

When the water-insoluble colorant is contained in the water phase, average particle size of the water-insoluble colorant is preferably 10 $\mu$m or less, more preferably 3 $\mu$m or less. When the average particle size exceeds 10 $\mu$m, the W/O emulsion of the ink tends to be destructed. Similarly, when the water-insoluble colorant is contained in the oil phase, average particle size of the water-insoluble colorant is preferably 10 $\mu$m or less, more preferably 3 $\mu$m or less, and a concrete particle size can be selected taking into account coloring ability and fixation to articles to be printed. Whether the water-insoluble colorant is present in the water phase or the oil phase, addition amount of the water-insoluble colorant is preferably 1–30% by weight, more preferably 3–10% by weight based on the total of the emulsion ink.

When the water-insoluble colorant is contained in the water phase, it is preferred that the water phase further comprises an oil-in-water (O/W) emulsion of resin and/or a water soluble resin, if necessary. By adding these components to the water phase, the water-insoluble colorant is improved in dispersibility and fixation to articles to be printed such as paper.

Examples of the O/W emulsion of resin include emulsions of resins such as polyvinyl acetate, copolymers of ethylene and vinyl acetate, copolymers of vinyl acetate and acrylic acid esters, polymethacrylic acid esters, polystyrene, copolymers of styrene and acrylic acid esters, styrene-butadiene copolymers, copolymers of vinylidene chloride and acrylic acid esters, polyvinyl chloride, copolymers of vinyl chloride and vinyl acetate, and polyurethane.

Examples of the water soluble resin include polyvinyl alcohol, methyl cellulose, carboxymethyl cellulose, hydroxyethyl cellulose, polyvinyl pyrrolidone, copolymers of polyethylene and polyvinyl alcohol, polyethylene oxide, polyvinyl ether, polyacrylamide, gum arabic, starch, and water-soluble polyurethane.

Addition amount of the O/W emulsion of resin and/or the water-soluble resin is preferably 1 to 20% by weight, more preferably 2 to 10% by weight as solid content based on the total weight of the ink. If it is less than 1% by weight, colorants contained in the water phase are not sufficient in dispersibility and fixation to articles to be printed. If it exceeds 20% by weight, inks form a film on perforations of a stencil sheet and become difficult to pass the perforations when inks are left on the stencil sheet for a long time.

Further, when the water-insoluble colorant is contained in the water phase, the water phase may contain, as dispersants, anionic surfactants, cationic surfactants, amphoteric surfactants, nonionic surfactants, polymeric, silicone-containing or fluorochemical surfactants, or such tertiary amine compounds as disclosed in Japanese Patent Laid-open (Kokai) No. 34944/96 corresponding to U.S. Pat. No. 5,609,670, or such acid anhydride containing water-soluble polymers as disclosed in Japanese Patent Application No. 177518/96 corresponding to U.S. patent application Ser. No. 08/874,633 filed Jun. 13, 1997, in order to improve wettability, dispersibility and the like of the water-insoluble colorant in water.

Whether the water-insoluble colorant is contained in the water phase or the oil phase, the water phase may further contain other water soluble additives such as electrolytes, wetting agents, water evaporation inhibiting agents, anti-freezing agents, antiseptics, antifungal agents and antioxidants, if necessary.

In the present emulsion ink, the oil phase basically comprises a non-volatile solvent, a volatile solvent, an emulsifier and the like, whether the water-insoluble colorant is contained in the water phase or the oil phase.

As the non-volatile solvent, can be used mineral oils such as motor oils, light oils, kerosine, spindle oils, machine oils and liquid paraffin, and vegetable oils such as olive oil, rape oil, castor oil, salad oil and soybean oil. As the volatile solvent, can be used known solvents of the types of mineral oils and vegetable oils. Proportion of non-volatile solvent to volatile solvent (i.e., non-volatile solvent/volatile solvent) varies depending upon blending ratio of the oil phase and the water phase, but can generally be 50-95/50-5 on weight basis.

In order to improve the colorant in dispersibility and fixation to paper, a resinous component may be added to the oil phase, whether the colorant is contained in the water phase or the oil phase. The resinous component includes alkyd resin, rosin-modified phenol resin, petroleum resin, maleic resin and the like.

The emulsifier is used to form the W/O emulsion, and is preferably a nonionic surfactant. As such a nonionic surfactant, mention may be made of sorbitan fatty acid esters such as sorbitanmonolaurate, sorbitanmonopalmitate, sorbitan monooleate, sorbitan sesquioleate and sorbitan monoisostearate; (poly)glycerol fatty acid esters such as oleic acid monoglyceride, oleic acid diglyceride, glyceryl monostearate, decaglyceryl decaoleate and hexaglyceryl pentaoleate, and ethylene oxide adducts thereof; propyleneglycol fatty acid esters; (poly) ethylene glycol fatty acid esters; and ethylene oxide adducts of higher alcohols, fatty acids, alkylethers, alkylphenols and (hardened) castor oils. It is desired that the emulsifier is properly selected so that the W/O emulsion of ink is not destroyed by surfactants that may be contained to disperse water-soluble colorants or to form O/W emulsions of resin in the water phase of the present ink.

The present W/O emulsion ink can readily be made, for example, by gradually adding 90 to 30% by weight of the above mentioned water phase to 10 to 70% by weight of the above mentioned oil phase and emulsifying the mixture.

EXAMPLES

Hereinafter, the present invention will be explained in more detail by way of presently preferred working examples. However, it should be understood that the present invention is not limited to the examples. In the following examples, the term "part(s)" means "part(s) by weight" unless otherwise indicated.

Example 1

A W/O emulsion ink was prepared in accordance with the formulation shown in Table 1 and the following procedure. First, ion-exchanged water, ammonium chloride, ammonia water (pH 12.0), ethylene glycol, furnace carbon black and a sulphonate type surfactant were thoroughly mixed together under stirring, and the components were dispersed using a ball mill. Polyacrylic acid ester (emulsion type) was added to and mixed with the resultant dispersion under stirring to obtain a water phase. Then, an oil phase was prepared by thoroughly mixing #40 motor oil, No.5 solvent manufactured by Nippon Oil Co. Ltd. and sorbitan monooleate under stirring. The water phase was gradually added to the oil phase and emulsified using a stirrer to obtain a water-in-oil (W/O) emulsion ink for stencil printing.

Meanwhile, pH of the water phase shown in Table 1 was measured at 23° C. by use of a pH meter HM-14 manufactured by TOA ELECTRONICS LTD.

Examples 2 to 3

Water-in-oil (W/O) emulsion inks for stencil printing were prepared in the same manner as in Example 1 in accordance with the formulations shown in Table 1.

Example 4

A W/O emulsion ink was prepared in accordance with the formulation shown in Table 1 and the following procedure. First, an oil phase was prepared by thoroughly mixing alkyd resin, furnace carbon black, #40 motor oil, No.5 solvent manufactured by Nippon Oil Co. Ltd. and sorbitan monooleate under stirring, and thoroughly kneading the mixture using a triple-roll mill. Then, a mixed solution of ion-exchanged water in which ammonium chloride had been dissolved, ammonia water (pH 12.0) and ethylene glycol, was gradually added to the oil phase and emulsified using a stirrer to obtain a water-in-oil (W/O) emulsion ink for stencil printing.

Example 5

A water-in-oil (W/O) emulsion ink for stencil printing was prepared in the same manner as in Example 4 in accordance with the formulations shown in Table 1.

Comparative Example 1

A W/o emulsion ink for stencil printing was prepared in the same manner as in Example 1 except that potassium tartrate was used as a pH adjusting agent. The formulation of this emulsion ink is shown in Table 2. The pH value of the water phase shown in Table 2 was measured at 23° C. by use of a pH meter HM-14 manufactured by TOA ELECTRONICS LTD.

Comparative Examples 2 to 3

Water-in-oil (W/O) emulsion inks for stencil printing were prepared in the same manner as in Comparative Example 1 in accordance with the formulations shown in Table 2.

Comparative Examples 4 to 5

Water-in-oil (W/O) emulsion inks for stencil printing were prepared in the same manner as in Example 4 in accordance with the formulations shown in Table 2.

TABLE 1

Formulations of W/O emulsion inks (parts by weight)

| Number of Examples | Ex. 1 | Ex. 2 | Ex. 3 | Ex. 4 | Ex. 5 |
|---|---|---|---|---|---|
| Oil phase: | | | | | |
| Non-volatile Solvent: #40 Motor oil | 13.0 | 13.0 | 13.0 | 13.0 | 13.0 |
| Volatile Solvent: No. 5 Solvent (manufactured by Nippon Oil Co. Ltd.) | 3.0 | 3.0 | 3.0 | 3.0 | 3.0 |
| Emulsifier: Sorbitan monooleate | 2.0 | 2.0 | 2.0 | 2.0 | 2.0 |
| Resin: Alkyd resin | — | — | — | 10.0 | 10.0 |
| Water-insoluble colorant: Furnace carbon black | — | — | — | 4.0 | 4.0 |
| Water phase: | | | | | |
| Water-insoluble colorant: Furnace carbon black | 4.0 | 4.0 | 4.0 | — | — |
| pH adjusting agent: | | | | | |
| Ammonium chloride | 0.5 | — | — | 0.5 | — |
| Ammonia water (pH 12.0) | 0.2 | — | — | 0.2 | — |
| Sodium tetraborate | — | 0.5 | — | — | — |
| Disodium hydrogenphosphate | — | — | 0.5 | — | — |
| Sodium hydroxide | — | — | — | — | 0.03 |
| Water: Ion-exchanged water | 60.3 | 60.5 | 65.5 | 61.3 | 61.97 |
| Dispersant: Sulfonate type surfactant | 1.0 | 1.0 | 1.0 | — | — |
| O/W emulsion of resin: Polyacrylate (solid content 50%) | 10.0 | 10.0 | — | — | — |
| Water-soluble resin: Polyvinyl alcohol (polymerization degree of 1500 or higher) | — | — | 5.0 | — | — |
| Wetting agent: Ethylene glycol | 6.0 | 6.0 | 6.0 | 6.0 | 6.0 |
| pH of the water phase at 23° C.: | 8.8 | 7.3 | 6.0 | 8.7 | 11.7 |

Note: "Ex." refers to Example.

TABLE 2

Formulations of W/O emulsion inks (parts by weight)

| Number of Examples | C.Ex. 1 | C.Ex. 2 | C.Ex. 3 | C.Ex. 4 | C.Ex. 5 |
|---|---|---|---|---|---|
| Oil phase: | | | | | |
| Non-volatile Solvent: #40 Motor oil | 13.0 | 13.0 | 13.0 | 13.0 | 13.0 |
| Volatile Solvent: No. 5 Solvent (manufactured by Nippon Oil Co. Ltd.) | 3.0 | 3.0 | 3.0 | 3.0 | 3.0 |
| Emulsifier: Sorbitan monooleate | 2.0 | 2.0 | 2.0 | 2.0 | 2.0 |
| Resin: Alkyd resin | — | — | — | 10.0 | 10.0 |
| Water-insoluble colorant: Furnace carbon black | — | — | — | 4.0 | 4.0 |
| Water phase: | | | | | |
| Water-insoluble colorant: Furnace carbon black | 4.0 | 4.0 | 4.0 | — | — |
| pH adjusting agent: | | | | | |
| Potassium tartrate | 0.5 | — | — | 0.5 | — |
| Potassium hydrogenphthalate | — | 0.5 | — | — | — |
| Sodium lactate | — | — | 0.5 | — | — |
| Sodium hydroxide | — | — | — | — | 0.5 |
| Water: Ion-exchanged water | 60.5 | 60.5 | 60.5 | 61.5 | 61.5 |
| Dispersant: Sulfonate type surfactant | 1.0 | 1.0 | 1.0 | — | — |
| O/W emulsion of resin: Polyacrylate (solid content 50%) | 10.0 | 10.0 | 10.0 | — | — |
| Water-soluble resin: Polyvinyl alcohol (polymerization degree of 1500 or higher) | — | — | — | — | — |
| Wetting agent: Ethylene glycol | 6.0 | 6.0 | 6.0 | 6.0 | 6.0 |
| pH of the water phase at 23° C.: | 3.8 | 5.5 | 3.5 | 4.0 | 12.3 |

Note: "C.Ex." refers to Comparative Example.

Performance Tests

Stencil printing was carried out by use of a stencil printing apparatus RISOGRAPH (registered trademark) GR275 (manufactured by RISO KAGAKU CORPORATION) with each of the inks prepared in Examples 1 to 5 and Comparative Examples 1 and 5. In addition, after the inks were left at 70° C. for 6 weeks, stencil printing was carried out by use of the inks in the same manner as above. Printing density, seep through and blurring of prints and storage stability were determined in accordance with the following procedures (1)–(4), and the results are shown in Tables 3 and 4.

(1) Printing density: Printing density on a solid region of print was measured using a reflection densitometer RD920 manufactured by Macbeth Corp.

(2) Seep through: Printing density on the side opposite to the solid region of print was measured by the same reflection densitometer as in (1).

(3) Blurring: Blurring around the ink on print was observed by use of a microscope of 80 times magnification.

When little or no blurring was observed, the result was indicated as (--). When blurring was observed but letters of 8 points were legible, the result was indicated as (-). When blurring was too much to recognize letters of 8 points, the result was indicated as (+).

(4) Storage stability: After ink was left at 70° C. for 6 weeks, ink was observed with naked eyes to determine destruction of emulsion. When no separation and little softening of emulsion ink was observed, the result was indicated as (--). When no separation but a little softening of emulsion ink was observed, the result was indicated as (-). When emulsion ink was observed to be greatly softened but not separated, the result was indicated as (+). When emulsion ink was separated, the result was indicated as (++).

TABLE 3

Results of performance tests

| Number of Examples | Ex. 1 | Ex. 2 | Ex. 3 | Ex. 4 | Ex. 5 | C.Ex. 1 | C.Ex. 2 | C.Ex. 3 | C.Ex. 4 | C.Ex. 5 |
|---|---|---|---|---|---|---|---|---|---|---|
| Printing density: | 1.21 | 1.22 | 1.15 | 1.07 | 1.05 | 1.18 | 1.18 | 1.16 | 1.04 | 1.05 |
| Seep through: | 0.14 | 0.12 | 0.14 | 0.20 | 0.21 | 0.13 | 0.14 | 0.13 | 0.21 | 0.21 |
| Blurring | (--) | (--) | (--) | (-) | (-) | (--) | (--) | (--) | (-) | (-) |

Note: "Ex." refers to Example, and "C.Ex." refers to Comparative Example.

TABLE 4

Results of performance tests

| Number of Examples | Ex. 1 | Ex. 2 | Ex. 3 | Ex. 4 | Ex. 5 | C.Ex. 1 | C.Ex. 2 | C.Ex. 3 | C.Ex. 4 | C.Ex. 5 |
|---|---|---|---|---|---|---|---|---|---|---|
| Printing density: | 1.19 | 1.20 | 1.15 | 1.08 | 1.08 | 1.30 | 1.29 | * | 1.20 | 1.22 |
| Seep through: | 0.15 | 0.13 | 0.14 | 0.22 | 0.23 | 0.20 | 0.23 | * | 0.29 | 0.29 |
| Blurring: | (--) | (--) | (--) | (-) | (-) | (+) | (+) | * | (+) | (+) |
| Storage stability: | (--) | (--) | (-) | (--) | (-) | (+) | (+) | (++) | (+) | (+) |

Note: "Ex." refers to Example, and "C.Ex." refers to Comparative Example. "*" indicates that printing was impossible due to separation of ink.

From Tables 3 and 4, it is understood that the inks of Examples 1 to 5 were excellent in stability so that prints obtained after storage of inks were not different in quality from prints obtained before storage of inks. On the other hand, it is understood that the inks of Comparative Examples 1 to 5 were inferior in stability, and caused softening and separation during storage, and blurring and seep through on prints were worse after storage than before storage.

The present W/O emulsion ink is superior in emulsion stability, causes no softening or separation even after stored for a long time, and thus can always provide prints of uniform quality.

We claim:

1. A water-in-oil (W/O) emulsion ink for stencil printing, having an oil phase and a water phase, in which said water phase contains a pH adjusting agent and has a pH of 6.0 to 12.0 at 23° C.

2. An emulsion ink for stencil printing according to claim 1, in which a water-insoluble colorant is contained in said water phase.

3. An emulsion ink for stencil printing according to claim 1, in which a water-insoluble colorant is contained in said oil phase.

4. An emulsion ink for stencil printing according to claim 1, in which said water phase has a pH buffer action.

* * * * *